United States Patent
Saguchi et al.

(10) Patent No.: US 12,300,809 B2
(45) Date of Patent: May 13, 2025

(54) NICKEL METAL HYDRIDE SECONDARY BATTERY

(71) Applicant: FDK CORPORATION, Tokyo (JP)

(72) Inventors: Akira Saguchi, Tokyo (JP); Shota Ohata, Tokyo (JP); Jun Ishida, Tokyo (JP); Yuki Ehara, Tokyo (JP); Masaru Kihara, Tokyo (JP)

(73) Assignee: FDK CORPORATION, Tokyo (JP)

( * ) Notice: Subject to any disclaimer, the term of this patent is extended or adjusted under 35 U.S.C. 154(b) by 418 days.

(21) Appl. No.: 17/660,387

(22) Filed: Apr. 22, 2022

(65) Prior Publication Data
US 2022/0384786 A1    Dec. 1, 2022

(30) Foreign Application Priority Data

May 28, 2021    (JP) .................. 2021-090604

(51) Int. Cl.
*H01M 4/36*    (2006.01)
*H01M 4/62*    (2006.01)
*H01M 10/30*   (2006.01)
*H01M 4/02*    (2006.01)

(52) U.S. Cl.
CPC ........... *H01M 4/366* (2013.01); *H01M 4/625* (2013.01); *H01M 10/30* (2013.01); *H01M 2004/027* (2013.01); *H01M 2004/028* (2013.01)

(58) Field of Classification Search
None
See application file for complete search history.

(56) References Cited

FOREIGN PATENT DOCUMENTS

| | | | |
|---|---|---|---|
| CN | 102903971 A | 1/2013 | |
| JP | H04137369 A | 5/1992 | |
| JP | H10134806 A | 5/1998 | |
| JP | 2016149299 A | 8/2016 | |
| JP | 2017182925 * | 10/2017 | ............. H01M 4/24 |
| WO | 2017169163 A1 | 10/2017 | |

OTHER PUBLICATIONS

Extended European Search Report dated Oct. 5, 2022, for corresponding European Application No. 22172032.9.

* cited by examiner

*Primary Examiner* — Wyatt P Mcconnell
*Assistant Examiner* — Angela J Martin
(74) *Attorney, Agent, or Firm* — Kinney & Lange, P.A.

(57) ABSTRACT

A nickel metal hydride secondary battery comprises an outer can and an electrode assembly housed in the outer can together with an alkaline electrolytic solution, wherein the electrode assembly is such that a positive electrode including a positive electrode mixture and a negative electrode including a negative electrode mixture are superimposed with a separator interposed therebetween, the positive electrode mixture includes nickel hydroxide forming a solid solution with zinc as a positive electrode active material and zinc oxide as a positive electrode additive, the negative electrode mixture includes hydrogen absorbing alloy particles and a negative electrode additive, the negative electrode additive is a composite in which yttrium fluoride is supported on carbon black, and a surface of the hydrogen absorbing alloy particles is partially coated with the composite.

2 Claims, 1 Drawing Sheet

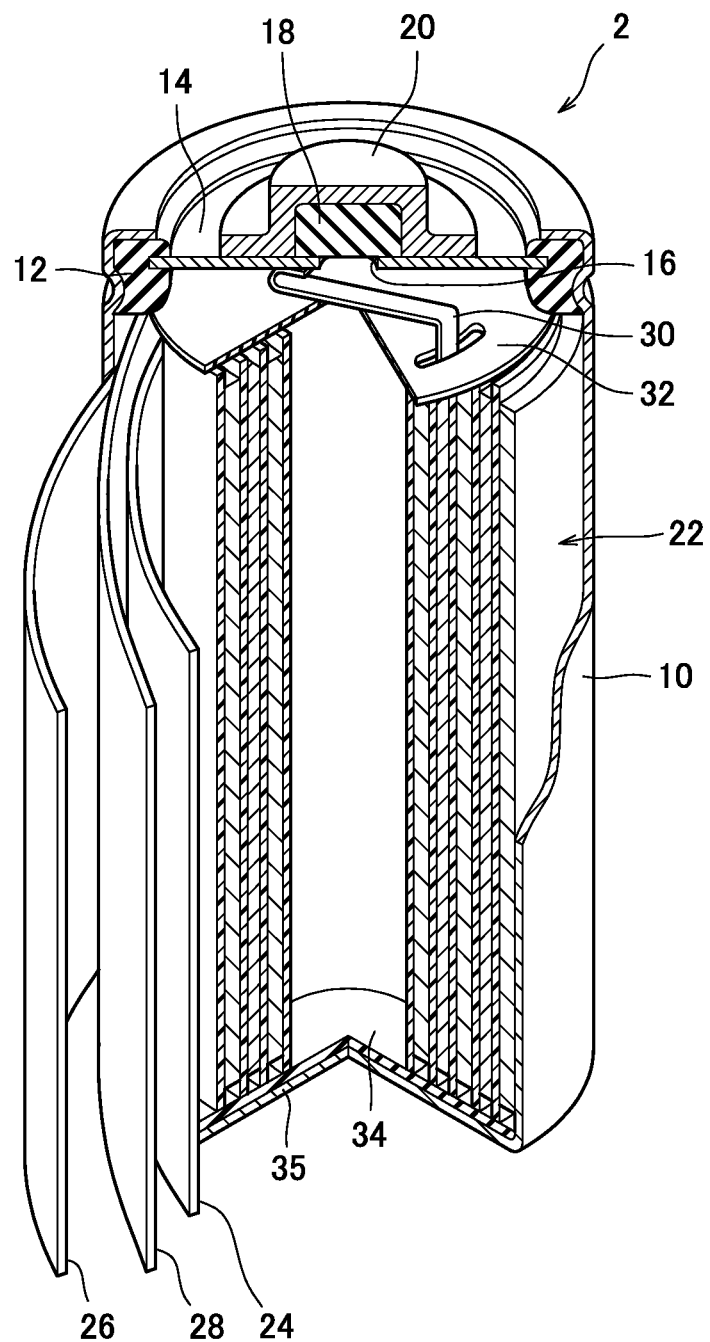

NICKEL METAL HYDRIDE SECONDARY BATTERY

CROSS-REFERENCE TO RELATED APPLICATION(S)

This application claims priority to Japanese Application No. 2021-090604 filed on May 28, 2021, which is incorporated herein by reference in its entirety.

BACKGROUND

Technical Field

The present disclosure relates to a nickel metal hydride secondary battery.

Description of the Related Art

It is known that nickel metal hydride secondary batteries are one type of alkaline secondary batteries. From the viewpoint that this nickel metal hydride secondary battery has a higher capacity as compared to a Ni—Cd secondary battery and is excellent in environmental safety, the nickel metal hydride secondary battery is used in various equipment such as portable devices and hybrid electric vehicles, and its applications have been expanding increasingly. Accompanying such an expansion of applications, a higher performance has been desired for the nickel metal hydride secondary battery. One such performance that needs to be enhanced in the nickel metal hydride secondary battery includes cycle life characteristics. If the cycle life characteristics are improved and the number of times of enabling repeated charge and discharge of the battery is increased, the convenience of the nickel metal hydride secondary battery will be improved.

The main reason for exhausting a cycle life of the nickel metal hydride secondary battery is that the alkaline electrolytic solution becomes unevenly distributed in the battery or is depleted as the battery is repeatedly charged and discharged, preventing contact between the alkaline electrolytic solution and the positive electrode and negative electrode, and thus preventing the battery reaction from proceeding. For example, when the positive electrode swells due to the battery reaction and the separator is squeezed, the separator is deprived of the alkaline electrolytic solution. As a result, the alkaline electrolytic solution is unevenly distributed in the battery in areas other than the separator, causing the separator to dry out, which is so called dryout. This renders discharge impossible to exhaust the life of the battery.

In order to inhibit such defects and extend the cycle life, a countermeasure of adding zinc compounds to a positive electrode is employed (see, for example, Japanese Patent Laid-Open No. 4-137368). When the zinc compound is added in such a manner, the positive electrode swells to prevent deprivation of the alkaline electrolytic solution in the separator, thereby contemplating to improve the cycle life of the battery.

However, the present situation is that the inhibition of swelling of the positive electrode by the addition of the zinc compound as described above alone is not sufficient to meet the recent demand for improving cycle life characteristics of batteries. Therefore, in order to inhibit the uneven distribution of alkaline electrolytic solution in the battery as described above, it has been contemplated to increase an injection volume of an alkaline electrolytic solution and to improve the cycle life characteristics.

Incidentally, when a nickel metal hydride secondary battery becomes overcharged, a reaction of generating an oxygen gas from a positive electrode takes place, causing an internal pressure of the battery to rise. If the internal pressure of the battery continues to rise, a safety valve of the battery is activated and an alkaline electrolytic solution is released to the outside together with the oxygen gas, which depletes the alkaline electrolytic solution and exhausts the life of the battery. However, the nickel metal hydride secondary battery also undergoes in parallel a reaction of absorbing an oxygen gas generated upon overcharge in the negative electrode. In other words, the nickel metal hydride secondary battery has a function of capable of inhibiting an increase in internal pressure of the battery due to the oxygen gas. In this way, a normal nickel metal hydride secondary battery can inhibit an increase in internal pressure of the battery, whereby reduction of battery life characteristics due to release followed by depletion of an alkaline electrolytic solution accompanying operation of a safety valve can be inhibited.

Here, an absorption reaction of oxygen gas in a negative electrode proceeds at a three-phase interface where solid, gas and liquid phases are present. In order to form a favorable three-phase interface, a certain amount of excess space is necessary in the battery. However, as described above, if an alkaline electrolytic solution is injected in a slightly larger amount into the battery in order to inhibit reduction of cycle life characteristics due to the uneven distribution of the alkaline electrolytic solution, the excess space will be insufficient and a favorable three-phase interface will not be formed. Then, the absorption reaction of oxygen gas does not proceed smoothly, the oxygen gas cannot be absorbed sufficiently, and the internal pressure of the battery increases. As a result, the safety valve of the battery is activated and the alkaline electrolytic solution is released to the outside, resulting in so-called leakage. If the leakage occurs, the alkaline electrolytic solution is depleted in the battery, resulting in troublesome of prematurely exhausting the battery life. Namely, even if the alkaline electrolytic solution is injected in a larger amount, the cycle life characteristics may be degraded. In particular, leakage is likely to occur in an initial stage of charge/discharge cycle. In detail, at the initial stage of the charge/discharge cycle, the alkaline electrolytic solution that has not fully permeated to an electrode assembly, in particular a separator, may remain at the top of the electrode assembly, etc., as well as activation treatment of the battery is insufficient, and the oxygen gas absorption reaction may not proceed smoothly. Therefore, the internal pressure of the battery is likely to increase and the safety valve is activated to release the remaining alkaline electrolytic solution in the upper portion of the electrode assembly, resulting in leakage.

Thus, development of a nickel metal hydride secondary battery that can inhibit occurrence of leakage in particular at an initial stage of charge/discharge cycles, even when an alkaline electrolytic solution is injected in a slightly larger amount has been desired.

SUMMARY

According to the present disclosure, provided is a nickel metal hydride secondary battery comprising a container and an electrode assembly housed in the container together with an alkaline electrolytic solution, wherein the electrode assembly is such that a positive electrode including a positive electrode mixture and a negative electrode including a negative electrode mixture are superimposed with a separator interposed therebetween, the positive electrode mixture includes nickel hydroxide forming a solid solution with zinc as a positive electrode active material and zinc oxide as a positive electrode additive, the negative electrode mixture includes hydrogen absorbing alloy particles and a negative electrode additive, the negative electrode additive is a composite in which yttrium fluoride is supported on carbon black, and a surface of the hydrogen absorbing alloy particles is partially coated with the composite.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein:

FIG. 1 is a perspective diagram of the nickel metal hydride secondary battery in one embodiment that is partially broken.

DETAILED DESCRIPTION

A nickel metal hydride secondary battery 2 (hereinafter referred to as "battery") according to one embodiment is described below with reference to the drawing.

Battery 2 is, for example, a cylindrical battery of AA size. In detail, as shown in FIG. 1, battery 2 comprises an outer can 10 as a container having a bottomed cylindrical shape with an open upper end. Outer can 10 has conductivity, and a bottom wall 35 thereof functions as a negative electrode terminal. A sealing assembly 11 is fixed to the opening of outer can 10. This sealing assembly 11 includes a lid plate 14 and a positive electrode terminal 20, and seals outer can 10 and provides a positive electrode terminal 20. Lid plate 14 is a disk-shaped member having conductivity. Lid plate 14 and a ring-shaped insulating packing 12 surrounding lid plate 14 are arranged in the opening of outer can 10, and insulating packing 12 is fixed to an opening edge 37 of outer can 10 by crimping opening edge 37 of outer can 10. Namely, lid plate 14 and insulating packing 12 cooperate with each other to airtightly clog up the opening of outer can 10.

Here, lid plate 14 has a central through hole 16 in the center, and a rubber vent member 18 that clogs up central through hole 16 is arranged on the outer surface of lid plate 14. Furthermore, a metal cylindrical positive electrode terminal 20 with a flange is electrically connected so as to cover valve body 18 on the outer surface of lid plate 14. This positive electrode terminal 20 presses vent member 18 toward lid plate 14. Incidentally, positive electrode terminal 20 has a gas vent hole left open, which is not shown in the FIGURE.

Under normal conditions, central through hole 16 is hermetically closed by vent member 18. If a gas is generated inside outer can 10 and the internal pressure increases, on the other hand, vent member 18 is compressed by the internal pressure and opens central through hole 16, resulting in a gas release from inside outer can 10 through central through hole 16 and the gas release hole (not shown) of positive electrode terminal 20. In other words, central through hole 16, vent member 18, and positive electrode terminal 20 form a safety valve for the battery.

Electrode assembly 22 is housed in outer can 10. This electrode assembly 22 includes a band-shaped positive electrode 24, a negative electrode 26, and a separator 28, respectively. In detail, the positive electrode 24 and negative electrode 26 are spirally wound with separator 28 interposed therebetween. Namely, positive electrode 24 and negative electrode 26 are superimposed with each other with separator 28 interposed therebetween. The outermost periphery of electrode assembly 22 is formed by a portion of negative electrode 26 (the outermost periphery) and contacts the inner periphery wall of outer can 10. Namely, negative electrode 26 and outer can 10 are electrically connected to each other.

Inside outer can 10, positive electrode lead 30 is arranged between one end of electrode assembly 22 and lid plate 14. In detail, positive electrode lead 30 has one end connected to positive electrode 24 and the other end connected to lid plate 14. Therefore, positive electrode terminal 20 and positive electrode 24 are electrically connected to each other via positive electrode lead 30 and lid plate 14. Incidentally, circular upper insulating member 32 is disposed between lid plate 14 and electrode assembly 22, and positive electrode lead 30 extends through slit 39 arranged in upper insulating member 32. Moreover, circular lower insulating member 34 is also disposed between electrode assembly 22 and the bottom of outer can 10.

Furthermore, a predetermined amount of an alkaline electrolytic solution (not shown) is injected into outer can 10. The alkaline electrolytic solution is impregnated into electrode assembly 22 and is mainly held in separator 28. This alkaline electrolytic solution allows an electrochemical reaction (charge/discharge reaction) to proceed upon charge/discharge between positive electrode 24 and negative electrode 26. As this alkaline electrolytic solution, an aqueous solution including at least one of KOH, NaOH, and LiOH as a solute is preferably used.

As a material of separator 28, for example, a nonwoven fabric composed of polyamide fibers to which a hydrophilic functional group is added, or a nonwoven fabric composed of polyolefin fibers such as polyethylene fibers or polypropylene fibers to which a hydrophilic functional group is added can be used. Specifically, a nonwoven fabric mainly composed of polyolefin fibers that were subjected to sulfonation treatment to impart sulfonic groups is preferably used. Here, the sulfonic group is imparted by treating the nonwoven fabric with an acid including a sulfate group, such as sulfuric acid or fuming sulfuric acid. A battery using a separator including such fibers having sulfonic groups exhibits excellent self-discharge characteristics.

Positive electrode 24 includes a conductive positive electrode core material having a porous structure and a positive electrode mixture held in the pores of the positive electrode core material. As the positive electrode core material as described above, foamed nickel can be used, for example.

The positive electrode mixture includes a positive electrode active material, a positive electrode additive, and a binder. The binder plays a roll of binding the positive electrode active material and the positive electrode additive to each other and also of binding the positive electrode active material and the positive electrode additive to the positive electrode core material. Here, the binder that is, for example, carboxymethylcellulose, methylcellulose, a PTFE (polytetrafluoroethylene) dispersion, a HPC (hydroxypropylcellulose) dispersion, etc., can be used.

Nickel hydroxide is used as the positive electrode active material. This nickel hydroxide is used in powder form. In other words, nickel hydroxide powder that is a cluster of nickel hydroxide particles, is used. This nickel hydroxide particle that has been highly ordered is preferably adopted.

The nickel hydroxide particle described above, forming a solid solution with Zn, is used. Zn as a solid solution component contributes to inhibiting the positive electrode from swelling.

The content of Zn allowed to form a solid solution with the nickel hydroxide particle is preferably 3.5 parts by mass or more and 4.5 parts by mass or less with respect to 100 parts by mass of nickel hydroxide.

The nickel hydroxide particle described above is preferably used such that it further forms a solid solution with Co. The Co as a solid solution component contributes to improvement of conductivity between positive electrode active material particles and improves charge acceptance. Here, if the content of Co allowed to form a solid solution with the nickel hydroxide particle is small, an effect of improving the charge acceptance is small; on the contrary, if the content is too large, grain growth of the nickel hydroxide particles is inhibited. For this reason, the nickel hydroxide particle is preferably used in an aspect of including 0.5% by mass or more and 5.0% by mass or less of Co as a solid solution component.

Moreover, the nickel hydroxide particle described above is preferably used in an aspect of the surface being coated with a surface layer including the cobalt compound. As this surface layer, a highly ordered cobalt compound layer including a cobalt compound having trivalent or a higher valence is preferably employed.

The highly ordered cobalt compound layer described above has excellent conductivity and forms a conductive network. This highly ordered cobalt compound layer is preferably employed such that the layer includes a cobalt compound such as cobalt oxyhydroxide (CoOOH) that has trivalent or a higher valence.

The positive electrode active material can be produced, for example, in the following manner First, nickel sulfate and zinc sulfate are weighed to a predetermined composition, and a mixed aqueous solution thereof is prepared. Then, a sodium hydroxide aqueous solution is gradually added to the mixed aqueous solution and the resulting mixture is reacted to precipitate nickel hydroxide particles mainly composed of nickel hydroxide and forming a solid solution with zinc. Here, when a solid solution with cobalt is further formed, nickel sulfate, zinc sulfate, and cobalt sulfate are weighed to a predetermined composition, and a mixed aqueous solution thereof is prepared. While stirring the resulting mixed aqueous solution, the sodium hydroxide aqueous solution is gradually added to the mixed aqueous solution followed by reacted, then to precipitate nickel hydroxide particles mainly composed of nickel hydroxide and forming a solid solution with zinc and cobalt.

When forming a conductive layer on the surface of the nickel hydroxide particles obtained as described above, for example, the conductive layer is formed by the procedure shown below.

First, nickel hydroxide particles forming a solid solution with zinc or nickel hydroxide particles forming a solid solution with zinc and cobalt, which were obtained in the aforementioned manner, are fed into an aqueous ammonia solution, and to this aqueous solution is added a cobalt sulfate aqueous solution. This allows precipitation of cobalt hydroxide on the surface of nickel hydroxide particles each serving as a nucleus, forming intermediate particles comprising a layer of cobalt hydroxide. The obtained intermediate particles are fed into a 25% by mass of sodium hydroxide aqueous solution. Here, when a mass of the intermediate powder that is a cluster of intermediate particles comprising layers of cobalt hydroxide is P, and a mass of the sodium hydroxide aqueous solution is Q, the mass ratio thereof is set so that P:Q=1:10. Then, the sodium hydroxide aqueous solution to which the intermediate powder was added is heat-treated under stirring for 5 hours to 10 hours while maintaining a temperature at 80° C. to 100° C.

Thereafter, the intermediate powder that has undergone the heat treatment described above is washed with water and dried at 50° C. to 80° C. to obtain positive electrode active material powder that is a cluster of nickel positive electrode active material particles in which the surface of nickel hydroxide particles is coated with the highly ordered cobalt oxide. By the heat treatment described above, the cobalt hydroxide on the surface of intermediate particles above becomes a highly conductive and highly ordered cobalt compound (such as cobalt oxyhydroxide) having an order of valence of trivalent or higher.

Next, zinc oxide is used as the positive electrode additive. This zinc oxide being in powder form is used. In other words, zinc oxide powder that is a cluster of zinc oxide particles is used. The amount of zinc oxide powder added is preferably 0.5 parts by mass or more and 1.0 parts by mass or less with respect to 100 parts by mass of the positive electrode active material powder.

Moreover, yttrium oxide or niobium oxide is preferably added to the positive electrode additive, as necessary.

Next, positive electrode 24 can be produced, for example, in the following manner First, to the positive electrode active material powder that is a cluster of the positive electrode active material particles obtained as described above are added the positive electrode additive, water, and a binder and the mixture is kneaded to prepare a positive electrode mixture slurry. The resulting positive electrode mixture slurry is, for example, filled into foamed nickel and subjected to drying treatment. Following the drying treatment, the foamed nickel filled with nickel hydroxide particles or the like, is rolled and then cut into pieces. As a result, positive electrode 24 including the positive electrode mixture is obtained.

Next, negative electrode 26 is described.

Negative electrode 26 has a beltlike conductive negative electrode core body in which the negative electrode mixture is held.

The negative electrode core body is a sheetlike metal material in which through holes are distributed, and for example, a punching metal sheet can be used. The negative electrode mixture is not only filled in the through holes of the negative electrode core body, but is also held in layer form on both sides of the negative electrode core body.

The negative electrode mixture includes hydrogen absorbing alloy particles capable of storing and releasing hydrogen as the negative electrode active material, the negative electrode additive, the binder, and a negative electrode auxiliary agent.

The binder described above plays a role in binding the hydrogen absorbing alloy particles, the negative electrode additive, etc., to each other as well as binding the hydrogen absorbing alloy particles, the negative electrode additive, etc., to the negative electrode core body. Here, the binder is not particularly limited, and for example, any binder commonly used for nickel metal hydride secondary batteries, such as hydrophilic or hydrophobic polymers and carboxymethyl cellulose, can be used.

Moreover, as the negative electrode auxiliary agent, styrene-butadiene rubber, a sodium polyacrylate, etc., can be used.

The type of hydrogen absorbing alloy in the hydrogen absorbing alloy particles is not particularly limited, and a rare earth-Mg—Ni-based hydrogen absorbing alloy including rare earth elements, Mg and Ni, is preferably used. More preferably, a hydrogen absorbing alloy having a composition represented by formula (I) shown below is used.

$$Ln_{1-x}Mg_xNi_{y-z}Al_z \ldots \quad (I)$$

However, in formula (I), Ln represents at least one element selected from the group consisting of La, Ce, Pr, Nd, Pm, Sm, Eu, Gd, Tb, Dy, Ho, Er, Tm, Yb, Lu, Sc, Y, Ti and Zr, and the subscripts x, y, and z satisfy the relationship represented as $0.05 \leq x \leq 0.30$, $2.8 \leq y \leq 3.8$, and $0.05 \leq z \leq 0.30$, respectively.

The particles of the hydrogen absorbing alloy can be obtained, for example, as follows.

First, metal raw materials are weighed and mixed to achieve a predetermined composition, and this mixture is melted, for example, in a high-frequency induction melting furnace to form an ingot. The resulting ingot is then subjected to heat treatment under an inert gas atmosphere at 900 to 1200° C. for 5 to 24 hours. Thereafter the ingot is mechanically pulverized under an inert gas atmosphere and sieved to obtain hydrogen absorbing alloy particles of desired sizes.

Here, the particle size of the particle of hydrogen absorbing alloy is not particularly limited, and preferably the average particle size is 55.0 to 70.0 µm. Incidentally, in the present description, the average particle size refers to an average particle size where an accumulated size based on mass is 50% and is determined by a laser diffraction/scattering method using a particle size distribution measurement apparatus.

The negative electrode additive is a composite of yttrium fluoride and carbon black as a conductive material. In detail, it is a composite in which yttrium fluoride is supported on carbon black.

Yttrium fluoride that is in powder form is used. In other words, yttrium fluoride powder that is a cluster of yttrium fluoride particles is used. As the yttrium fluoride particle, an average particle size thereof of 1 µm to 7 µm are preferably adopted.

Carbon black that has a powder form in which aggregates of primary particles are gathered is used. Here, the average size of the primary particles of carbon black is 20 to 50 nm, and the length of the aggregate is 10 µm to 100 µm.

Further, carbon black that is hollow carbon black such that primary particles have a hollow shell structure is preferably used. This hollow carbon black is superior in conductivity compared to ordinary carbon black.

A composite of yttrium fluoride and carbon black as the negative electrode additive can be produced, for example, as follows.

A paste is prepared by kneading yttrium fluoride powder, carbon black powder, sodium polyacrylate, carboxymethyl cellulose, and water. In the resulting paste, a composite in which yttrium fluoride is supported on carbon black is formed.

Next, negative electrode 26 can be produced, for example, in the following manner First, the hydrogen absorbing alloy powder that is a cluster of hydrogen absorbing alloy particles obtained as described above is added to a paste including the composite in which yttrium fluoride is supported on carbon black, and the mixture is kneaded. This allows the surface of hydrogen absorbing alloy particles to be partially coated with the aforementioned composite. Thereafter, styrene-butadiene rubber powder and water are further added to the paste, and they are kneaded to prepare a negative electrode mixture paste. A negative electrode core body is coated with the negative electrode mixture paste obtained and the coating body is dried. Following drying, the negative electrode core body holding the hydrogen absorbing alloy powder, the negative electrode additive, etc., is entirely rolled to increase a packing density of the hydrogen absorbing alloy, thereby obtaining an intermediate product of the negative electrode. The intermediate product of the negative electrode is then cut into a predetermined shape. Negative electrode 26 is produced in this manner Positive electrode 24 and negative electrode 26 produced in the aforementioned manner are spirally wound with separator 28 interposed therebetween, thereby forming the electrode assembly 22.

Electrode assembly 22 thus obtained is housed in outer can 10. Subsequently, a predetermined amount of alkaline electrolytic solution is injected into outer can 10. Thereafter, outer can 10 housing electrode assembly 22 and the alkaline electrolytic solution is sealed with sealing assembly 11 equipped with positive electrode terminal 20 to obtain a battery 2 according to the present disclosure. Battery 2 obtained is subjected to initial activation treatment to render it ready for use.

EXAMPLE

1. Production of a Battery

Example 1

(1) Production of Positive Electrode

Nickel sulfate, zinc sulfate, and cobalt sulfate were weighed so that zinc accounted for 4.0 parts by mass and cobalt accounted for 1.0 part by mass relative to 100 parts by mass of nickel hydroxide, and added to a 1 mol/L sodium hydroxide aqueous solution including ammonium ions to prepare a mixed aqueous solution. While stirring the obtained mixed aqueous solution, the 1 mol/L sodium hydroxide aqueous solution was gradually added to the mixed aqueous solution followed by being reacted, and a pH was stabilized at 11 to produce base particles mainly composed of nickel hydroxide, forming a solid solution with Zn and Co.

The obtained base particles were washed three times with 10 times the amount of pure water, and then dehydrated and dried. Incidentally, a particle size of each of the obtained base particles was measured by using a laser diffraction/scattering particle size analyzer, resulting in an average particle size of the base particles of 8 µm, which corresponds to 50% of the accumulation based on mass of the base particles.

Next, the obtained base particles were fed into a cobalt sulfate aqueous solution, and while stirring this cobalt sulfate aqueous solution, a 1 mol/L sodium hydroxide aqueous solution was gradually added dropwise, and the mixture was reacted to form a precipitate while maintaining the pH at 11 during the reaction. Then, the precipitate formed was filtered off, washed with pure water, and dried in vacuum. According to this procedure, intermediate product particles comprising a layer of 5% by mass of cobalt hydroxide on the surface of base particles, was obtained. It is noted that the thickness of the layer of cobalt hydroxide was about 0.1 µm.

Next, the intermediate product particles were fed in a 25% by mass of sodium hydroxide aqueous solution. Here, when a mass of the powder that is a cluster of the intermediate product particles is P, and a mass of the sodium hydroxide aqueous solution is Q, a mass ratio thereof was set so that P:Q=1:10. Then, the sodium hydroxide aqueous solution to which the powder of the intermediate product was added was subjected to heat treatment where the temperature was maintained constant at 85° C. for 8 hours while stirring.

The powder of the intermediate product that underwent the aforementioned heat treatment was washed with pure water and dried by applying warm air at 65° C. As a result, positive electrode active material powder that was a cluster of positive electrode active material particles having a surface layer including highly ordered cobalt oxide on the surface of base particles forming a solid solution with Zn and Co, was obtained.

Next, to 100 parts by mass of the positive electrode active material powder obtained as described above were added 0.5 parts by mass of yttrium oxide powder, 0.3 parts by mass of niobium oxide powder, 0.5 parts by mass of zinc oxide powder, and 50.0 parts by mass of water including 0.2% by mass of hydroxypropyl cellulose powder as a binder and the mixture was kneaded to prepare a slurry of the positive electrode mixture.

Then, the slurry of the positive electrode mixture was filled into sheetlike foamed nickel as the positive electrode core member. Here, the foamed nickel that had an area density (basis weight) of about 350 g/m$^2$, a porosity of 95%, and a thickness of 1.3 mm was used.

After drying the foamed nickel filled with the slurry of the positive electrode mixture, the foamed nickel filled with the positive electrode mixture was adjusted so that a filling density of the positive electrode active material, calculated by the following formula (II) was 3.0 g/cm$^3$, rolled and then cut into the specified dimensions to obtain positive electrode 24 of AA size.

Filling density of positive electrode active material [g/cm$^3$]=Mass of positive electrode mixture [g]÷(electrode height [cm]×electrode length [cm]×electrode thickness [cm]−mass of foamed nickel [g]÷density of nickel [g/cm$^3$]) . . . (II)

(2) Production of Negative Electrode

The respective metal materials of La, Sm, Mg, Ni, and Al were mixed at a predetermined molar ratio, and the mixture was then charged into a high-frequency induction melting furnace for melting, and cooled to produce an ingot.

Next, the ingot was subjected to heat treatment under an argon gas atmosphere at a temperature of 1,000° C. for 10 hours to homogenize it, followed by mechanical pulverization under an argon gas atmosphere to obtain a rare earth-Mg-Ni-based hydrogen absorbing alloy powder. The obtained rare earth-Mg—Ni-based hydrogen absorbing alloy powder was measured for a particle size distribution with a laser diffraction/scattering particle size distribution measurement apparatus (apparatus name: SRA-150 manufactured by Microtrac Inc.). As a result, the average particle size was 65 µm, which corresponds to 50% of the accumulation based on mass.

Analysis on a composition of this hydrogen absorbing alloy powder by high-frequency inductively coupled plasma atomic emission spectrometry (ICP-AES) demonstrated that the composition was $La_{0.27}Sm_{0.63}Mg_{0.10}Ni_{3.33}Al_{0.17}$. Moreover, X-ray diffraction (XRD) measurement of this hydrogen absorbing alloy powder demonstrated that the crystal structure was a so called superlattice structure of $A_2B_7$ type ($Ce_2Ni_7$ type).

Next, the negative electrode mixture was produced. First, as the step of first stage, 0.1 parts by mass of yttrium fluoride powder that is a cluster of yttrium fluoride particles having an average particle size of 1 µm, and 0.50 parts by mass of hollow carbon black with a hollow shell structure (specifically, Ketjen Black (registered trademark) manufactured by Lion Specialty Chemicals Co., Ltd., were used. The physical properties of this hollow carbon black include a specific surface area of 1,270 m$^2$/g by a BET method, a porosity of 80%, an average primary particle size of 34.0 nm, and an aggregate length of 10 µm), 0.30 parts by mass of sodium polyacrylate powder, 0.05 parts by mass of carboxymethyl cellulose powder, and 20 parts by mass of water, were prepared, and they were kneaded under an environment of 25° C. The first paste was prepared in this way. In the first paste obtained, a composite of the negative electrode additive in which yttrium fluoride is supported on carbon black is formed.

Next, in the step of second stage, to the first paste were added 100 parts by mass of the hydrogen absorbing alloy powder obtained as described above and then kneaded. By this procedure, a portion of the surface of hydrogen absorbing alloy particles was partially coated with the composite in which yttrium fluoride was supported on carbon black.

Further, to the first paste were added 0.5 parts by mass of styrene-butadiene rubber powder and 15 parts by mass of water and kneaded under an environment of 25° C. to prepare a negative electrode mixture paste.

Both sides of a punching metal sheet as the negative electrode core body was coated with this negative electrode mixture paste so that the thickness was even and constant. Moreover, the through holes are also filled with the negative electrode mixture paste. It is noted that the punching metal sheet is a beltlike iron with a thickness of 50 µm, having a large number of through holes formed and distributed in the thickness direction, and is nickel-plated on the surface.

After drying of the negative electrode mixture paste, the punching metal sheet holding the hydrogen absorbing alloy, etc., was adjusted so that a filling density of the hydrogen absorbing alloy, calculated by the following formula (III) was 6.4 g/cm$^3$, and then rolled to obtain an intermediate product of the negative electrode.

Filling density of hydrogen absorbing alloy [g/cm$^3$] =Mass of hydrogen absorbing alloy [g]÷(electrode height [cm]×electrode length [cm]×electrode thickness [cm]−mass of punching metal sheet [g]÷density of iron [g/cm$^3$]) . . . (III)

Thereafter, the intermediate product of the negative electrode was cut into predetermined dimensions to obtain negative electrode 26 of AA size. Moreover, a sample was separately taken from the intermediate product of the negative electrode, and the sample obtained was observed by using a scanning electron microscope. As a result, it was confirmed that the surface of hydrogen absorbing alloy particles was partially coated with the composite in which yttrium fluoride was supported on carbon black.

(3) Assembly of Nickel Metal Hydride Secondary Battery

Positive electrode 24 and negative electrode 26 obtained as described above were spirally wound with separator 28 sandwiched therebetween to produce electrode assembly 22. Separator 28 used in the production of electrode assembly 22 was a nonwoven fabric composed of sulfonated polypropylene fibers with a thickness of 0.1 mm (basis weight of 40 g/m$^2$).

On the other hand, an alkaline electrolytic solution including KOH, NaOH and LiOH as solutes was prepared. This alkaline electrolytic solution has a mixing ratio by mass of KOH, NaOH, and LiOH of 4:5:1 and a specific gravity of 1.31.

Then, electrode assembly 22 described above was housed in the bottomed cylindrical outer can 10, and 2.0 g of the alkaline electrolytic solution prepared was injected. After that, the opening of outer can 10 was sealed with sealing assembly 11 to assemble battery 2 of AA size, having a nominal capacity of 2000 mAh.

(4) Initial Activation Treatment

A charge/discharge cycle where battery 2 obtained was charged for 16 hours at a charging current of 1.0 It under an environment of 25° C., and then discharged at a discharging current of 1.0 It until the battery voltage reached 1.0 V was repeated three times. The initial activation treatment was carried out in such a way to render battery 2 ready for use.

Example 2

A nickel metal hydride secondary battery was produced in the same manner as in Example 1, except that a composite of negative electrode additive was produced by adding 0.2 parts by mass of yttrium fluoride powder. Incidentally, in the negative electrode according to Example 2 as well, it was confirmed that the surface of particles of hydrogen absorbing alloy was partially coated with the composite in which yttrium fluoride was supported on carbon black.

Example 3

A nickel metal hydride secondary battery was produced in the same manner as in Example 1, except that a positive electrode active material powder was produced so that the solid solution amount of zinc was 3.5 parts by mass. Incidentally, in the negative electrode according to Example 3 as well, it was confirmed that the surface of particles of hydrogen absorbing alloy was partially coated with the composite in which yttrium fluoride was supported on carbon black.

Example 4

A nickel metal hydride secondary battery was produced in the same manner as in Example 1, except that a positive electrode active material powder was produced so that the solid solution amount of zinc was 4.5 parts by mass. Incidentally, in the negative electrode according to Example 4 as well, it was confirmed that the surface of particles of hydrogen absorbing alloy was partially coated with the composite in which yttrium fluoride was supported on carbon black.

Example 5

A nickel metal hydride secondary battery was produced in the same manner as in Example 1, except that a positive electrode mixture was produced so that the amount of zinc oxide added was 0.75 parts by mass. Incidentally, in the negative electrode according to Example 5 as well, it was confirmed that the surface of particles of hydrogen absorbing alloy was partially coated with the composite in which yttrium fluoride was supported on carbon black.

Example 6

A nickel metal hydride secondary battery was produced in the same manner as in Example 1, except that a positive electrode active material powder was produced so that the amount of zinc oxide added was 1.0 parts by mass. Incidentally, in the negative electrode according to Example 6 as well, it was confirmed that the surface of particles of hydrogen absorbing alloy was partially coated with the composite in which yttrium fluoride was supported on carbon black.

Example 7

A nickel metal hydride secondary battery was produced in the same manner as in Example 1, except that a composite of negative electrode additive was produced by adding 0.3 parts by mass of yttrium fluoride powder. Incidentally, in the negative electrode according to Example 7 as well, it was confirmed that the surface of particles of hydrogen absorbing alloy was partially coated with the composite in which yttrium fluoride was supported on carbon black.

Example 8

A nickel metal hydride secondary battery was produced in the same manner as in Example 1, except that a composite of negative electrode additive was produced by adding 0.05 parts by mass of yttrium fluoride powder. Incidentally, in the negative electrode according to Example 8 as well, it was confirmed that the surface of particles of hydrogen absorbing alloy was partially coated with the composite in which yttrium fluoride was supported on carbon black.

Example 9

A nickel metal hydride secondary battery was produced in the same manner as in Example 1, except that a positive electrode active material powder was produced so that the solid solution amount of zinc was 3.0 parts by mass. Incidentally, in the negative electrode according to Example 9 as well, it was confirmed that the surface of particles of hydrogen absorbing alloy was partially coated with the composite in which yttrium fluoride was supported on carbon black.

Example 10

A nickel metal hydride secondary battery was produced in the same manner as in Example 1, except that a positive electrode active material powder was produced so that the solid solution amount of zinc was 5.0 parts by mass. Incidentally, in the negative electrode according to Example 10 as well, it was confirmed that the surface of particles of hydrogen absorbing alloy was partially coated with the composite in which yttrium fluoride was supported on carbon black.

Example 11

A nickel metal hydride secondary battery was produced in the same manner as in Example 1, except that a positive electrode active mixture was produced so that the amount of zinc oxide was 0.25 parts by mass. Incidentally, in the negative electrode according to Example 11 as well, it was confirmed that the surface of particles of hydrogen absorbing alloy was partially coated with the composite in which yttrium fluoride was supported on carbon black.

Example 12

A nickel metal hydride secondary battery was produced in the same manner as in Example 1, except that a positive electrode active material powder was produced so that the solid solution amount of zinc was 3.0 parts by mass, and a positive electrode mixture was produced by adding 1.25 parts by mass of zinc oxide. Incidentally, in the negative electrode according to Example 12 as well, it was confirmed that the surface of particles of hydrogen absorbing alloy was partially coated with the composite in which yttrium fluoride was supported on carbon black.

Comparative Example 1

A nickel metal hydride secondary battery was produced in the same manner as in Example 1, except that yttrium fluoride powder was not added in the production of the composite of negative electrode additive, zinc was not allowed to form a solid solution in production of the positive electrode active material powder, and zinc oxide was not added in production of the positive electrode mixture. Incidentally, in the negative electrode in Comparative Example 1, the surface of particles of the hydrogen absorbing alloy was confirmed not to be coated with the composite in which yttrium fluoride was supported on carbon black.

Comparative Example 2

A nickel metal hydride secondary battery was produced in the same manner as in Example 1, except that yttrium fluoride powder was not added in the production of the composite of negative electrode additive. Incidentally, in the negative electrode in Comparative Example 2, the surface of particles of the hydrogen absorbing alloy was confirmed not to be coated with the composite in which yttrium fluoride was supported on carbon black.

Comparative Example 3

A nickel metal hydride secondary battery was produced in the same manner as in Example 1, except that zinc was not allowed to form a solid solution in the production of the positive electrode active material powder, and zinc oxide was not added in the production of the positive electrode mixture. Incidentally, in the negative electrode in Comparative Example 3, the surface of particles of the hydrogen absorbing alloy was confirmed to be partially coated with the composite in which yttrium fluoride was supported on carbon black.

Comparative Example 4

A nickel metal hydride secondary battery was produced in the same manner as in Example 1, except that the step of first stage and the step of second stage were not separated when producing a negative electrode mixture, and a negative electrode mixture paste was prepared by mixing all the constituent materials of the negative electrode mixture. Namely, in Comparative Example 4, a composite of the negative electrode additive in which yttrium fluoride was supported on carbon black is not formed. It is noted that in the negative electrode according to Comparative Example 4, the surface of particles of the hydrogen absorbing alloy was confirmed not to be coated with the composite in which yttrium fluoride was supported on carbon black.

2. Evaluation of Nickel Metal Hydride Secondary Battery (1) Leakage Test at Initial Stage of Cycle Test The batteries of Examples 1 to 12 and Comparative Examples 1 to 4, which had undergone initial activation treatment, were each charged by a so called $-\Delta V$ control where after reaching a maximum value of a battery voltage at a charging current of 1.0 It under an environment of 25° C., the battery was charged until the voltage dropped by 10 mV. Following completion of charge, each battery stood undisturbed in an environment of 25° C. for 30 minutes. Then, each battery after having stood undisturbed for 30 minutes, was then discharged at a discharging current of 1.0 It until the battery voltage reached 1.0 V under an environment of 25° C., and then stood undisturbed for 30 minutes. This charge/discharge cycle was defined as one cycle, and the cycle test of repeating this cycle 20 times was conducted. After the cycle test, each battery was confirmed for presence or absence of leakage, and the number of batteries that had leakage was counted. The results thereof are shown in Table 1 as the number of initial leakage in the cycle test. Incidentally, 100 batteries of Examples 1 to 12 and 100 batteries of Comparative Examples 1 to 4 were prepared, respectively, and the number of batteries that had leakage out of the 100 batteries was counted. The lower the number of leakage, the more excellent the leakage inhibition effect, and thus the more excellent the cycle life characteristics.

TABLE 1

|  | Amount of yttrium fluoride added relative to 100 parts by mass of hydrogen absorbing alloy [Parts by mass] | Solid solution amount of zinc relative to 100 parts by mass of nickel hydroxide [Parts by mass] | Amount of zinc oxide added relative to 100 parts by mass of positive electrode active material [Parts by mass] | Number of initial leakage in cycle test [Number] | Presence or absence of coating with composite on surface of hydrogen absorbing alloy |
|---|---|---|---|---|---|
| Example 1 | 0.1 | 4.0 | 0.5 | 0/100 | Present |
| Example 2 | 0.2 | 4.0 | 0.5 | 0/100 | Present |
| Example 3 | 0.1 | 3.5 | 0.5 | 0/100 | Present |
| Example 4 | 0.1 | 4.5 | 0.5 | 0/100 | Present |
| Example 5 | 0.1 | 4.0 | 0.75 | 0/100 | Present |
| Example 6 | 0.1 | 4.0 | 1.0 | 0/100 | Present |
| Example 7 | 0.3 | 4.0 | 0.5 | 2/100 | Present |
| Example 8 | 0.05 | 4.0 | 0.5 | 4/100 | Present |
| Example 9 | 0.1 | 3.0 | 0.5 | 4/100 | Present |
| Example 10 | 0.1 | 5.0 | 0.5 | 3/100 | Present |
| Example 11 | 0.1 | 4.0 | 0.25 | 3/100 | Present |
| Example 12 | 0.1 | 3.0 | 1.25 | 3/100 | Present |
| Comparative Example 1 | — | — | — | 10/100 | Absent |
| Comparative | — | 4.0 | 0.5 | 8/100 | Absent |

TABLE 1-continued

|  | Amount of yttrium fluoride added relative to 100 parts by mass of hydrogen absorbing alloy [Parts by mass] | Solid solution amount of zinc relative to 100 parts by mass of nickel hydroxide [Parts by mass] | Amount of zinc oxide added relative to 100 parts by mass of positive electrode active material [Parts by mass] | Number of initial leakage in cycle test [Number] | Presence or absence of coating with composite on surface of hydrogen absorbing alloy |
|---|---|---|---|---|---|
| Example 2 Comparative Example 3 | 0.1 | — | — | 9/100 | Present |
| Comparative Example 4 | 0.1 | 4.0 | 0.5 | 8/100 | Absent |

(2) Discussion

The nickel metal hydride secondary batteries of Examples 1 to 12 each in an aspect that zinc is allowed to form a solid solution with the positive electrode active material and zinc oxide is included as the positive electrode additive in the positive electrode, and the surface of particles of the hydrogen absorbing alloy is coated partially with the negative electrode additive composed of the composite in which yttrium fluoride is supported on carbon black in the negative electrode has a less number of batteries that had leakage, compared with the nickel metal hydride batteries of Comparative Examples 1 to 4 each in an aspect that zinc is not allowed to form a solid solution with the positive electrode active material and zinc oxide is not included as the positive electrode additive in the positive electrode, or the surface of particles of the hydrogen absorbing alloy is not coated with the aforementioned composite in the negative electrode. From this it can therefore be said that the fact that the zinc allowed to form a solid solution with the positive electrode active material and the zinc oxide included as the positive electrode additive in the positive electrode, and the surface of particles of the hydrogen absorbing alloy in the negative electrode is coated with the negative electrode additive composed of the composite in which yttrium fluoride is supported on carbon black in the negative electrode inhibits the inner pressure of the battery from rising and prevents leakage at the initial stage of the charge/discharge cycles.

Comparing Example 1 with Comparative Example 4, the number of leakages in Example 1 is less than that in Comparative Example 4, indicating that Example 1 exhibits an excellent leakage inhibition effect. The composition of the positive electrode active material, the composition of the constituent materials of the positive electrode additive, and the composition of the constituent materials of the negative electrode additive are the same in Example 1 and Comparative Example 4; however, in Example 1, the negative electrode additive is in the form of the composite of yttrium fluoride and carbon black and the surface of particles of the hydrogen absorbing alloy is partially coated with the composite, whereas in Comparative Example 4, the negative electrode additive is not in the form of the composite of yttrium fluoride and carbon black, and the surface of particles of the hydrogen absorbing alloy is not coated with the composite. From this it can be said that the fact that the negative electrode additive being in the form of the composite of yttrium fluoride and carbon black and the composite partially coating the surface of particles of the hydrogen absorbing alloy is partially coated with the composite inhibits the internal pressure of the battery from rising and is particularly effective in preventing leakage of the battery.

From the results of Examples 1, 2, 7, and 8 each in which the amount of yttrium fluoride added was varied, the leakage inhibition effect of Examples 1 and 2 is found to be superior, and therefore it can be said that the amount of yttrium fluoride added relative to 100 parts by mass of the hydrogen absorbing alloy is preferably set to 0.1 parts by mass or more and 0.2 parts by mass or less.

From the results of Examples 1, 3, 4, 9, and 10 each in which the amount of solid solution of zinc was varied, the leakage inhibition effect of Examples 1, 3, and 4 is superior, from which it can therefore be said that the amount of solid solution of zinc is preferably set to 3.5 parts by mass or more and 4.5 parts by mass or less relative to 100 parts by mass of nickel hydroxide.

From the results of Examples 1, 5, 6, 11, and 12 each in which the amount of zinc oxide added was varied, the leakage inhibition effect of Examples 1, 5, and 6 is superior, and therefore, it can be said that the amount of zinc oxide added is preferably set to 0.5 parts by mass or more and 1.0 parts by mass or less relative to 100 parts by mass of the positive electrode active material.

Embodiments of the present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims.

What is claimed is:

1. A nickel metal hydride secondary battery comprising a container and an electrode assembly housed in the container together with an alkaline electrolytic solution, wherein:
   the electrode assembly is such that a positive electrode including a positive electrode mixture and a negative electrode including a negative electrode mixture are superimposed with a separator interposed therebetween;
   the positive electrode mixture includes nickel hydroxide forming a solid solution with zinc as a positive electrode active material and zinc oxide as a positive electrode additive;
   the negative electrode mixture includes hydrogen absorbing alloy particles and a negative electrode additive;
   the negative electrode additive is a composite in which yttrium fluoride is supported on carbon black; and
   a surface of the hydrogen absorbing alloy particles is partially coated with the composite.

2. The nickel metal hydride secondary battery according to claim 1, wherein:
   the zinc forms a solid solution at a concentration of 3.5 parts by mass or more and 4.5 parts by mass or less with respect to 100 parts by mass of the nickel hydroxide;

the zinc oxide is added at a concentration of 0.5 parts by mass or more and 1.0 parts by mass or less with respect to 100 parts by mass of the positive electrode active material; and the yttrium fluoride accounts for 0.1 parts by mass or more and 0.2 parts by mass or less with respect to 100 parts by mass of the hydrogen absorbing alloy.

* * * * *